Patented Mar. 18, 1941

2,235,511

UNITED STATES PATENT OFFICE 2,235,511

DIARYL-MONOINDOLYL-METHANE DYESTUFFS

Paul Herbert Wolff, deceased, late of Frankfort-on-the-Main-Hochst, Germany, by Richard Wenzel, administrator, Frankfort-on-the-Main-Hochst, Germany, and Karl Frank, Frankfort-on-the-Main-Hochst, Germany, assignors to General Aniline & Film Corporation, a corporation of Delaware No Drawing. Application December 21, 1938, Serial No. 247,052. In Germany May 3, 1938

4 Claims. (Cl. 260—319)

The present invention relates to diaryl-monoindolyl-methane dyestuffs.

We have found that very valuable diaryl-monoindolyl-methane dyestuffs, which may be converted in substance or on the fiber into complex metal compounds, are made by condensing a 4'-halogenbenzophenone-3-hydroxy-4-carboxylic acid with an indole compound which contains in its alpha-position an aryl group of the benzene series, for instance by heating the reagents in the presence of a diluent and an acid condensing agent, sulfonating the condensation product thus obtained—the latter process step may also be performed simultaneously with the condensation by using an agent having a condensing and sulfonating action—and finally exchanging the reactive halogen atom in the product for a primary or secondary aromatic amine radical of the benzene series. Alternatively, the sulfonation may be performed after the exchange of the halogen atom for an aromatic amine radical.

The present invention comprises new dyestuffs, for instance those of the general formula:

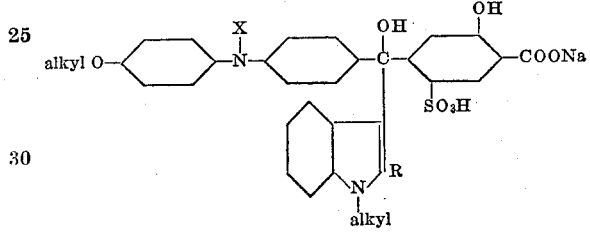

wherein X represents a member of the group consisting of hydrogen and alkyl and R represents an aryl group of the benzene series.

The hitherto unknown 4-chlorobenzophenone-3'-hydroxy-4'-carboxylic acid used as parent material, may be prepared as follows: 3-nitro-4-toluic acid chloride is condensed with chlorobenzene in the presence of aluminium chloride by the Friedel-Craft's reaction to form the 4-chloro-3'-nitro-4'-methylbenzophenone. The 4-chloro-3'-amino-4'-methylbenzophenone obtained therefrom by reduction of the nitro-group is acetylated for protecting the amino-group and the methyl group is then oxidized by means of potassium permanganate in a neutral aqueous solution to form the carboxylic acid. After saponification of the acetylamino-group the amino-group is exchanged according to known methods for the hydroxy-group. The corresponding 4-bromo-compound may be prepared in a similar manner.

The following examples serve to illustrate the invention, but they are not intended to limit it thereto; the parts are by weight:

(1) 276.5 parts of 4'-chloro-3-hydroxybenzophenone-4-carboxylic acid are condensed with 207 parts of 1-methyl-2-phenylindole in 3000 parts of alcoholic hydrochloric acid by heating to boiling for a short time, for instance for half an hour, in a reflux apparatus. The condensation product is isolated by precipitation with water. It is then dried and sulfonated at 25° C. with 10 times its weight of fuming sulfuric acid containing 10 per cent of sulfuric anhydride. The free sulfonic acid is dried and melted with 3 times its weight of para-phenetidine at about 70° C. for about one hour. The excess of para-phenetidine is removed by stirring with dilute hydrochloric acid and the dyestuff is then isolated in the form of the sodium salt. It dyes wool green tints which when after-chromed acquire a fuller shade and have distinctly improved fastness properties.

(2) By replacing the para-phenetidine used for exchanging the reactive chlorine in Example 1 by N-methyl-para-phenetidine a similar dyestuff is obtained which dyes wool yellowish green shades which may be after-chromed with improvement of their fastness properties.

(3) 276.5 parts of 4'-chloro-3-hydroxybenzophenone-4-carboxylic acid are condensed with 311.5 parts of 1-isobutyl-2-para-chlorophenyl-4.6-dimethylindole in 2000 parts of chlorosulfonic acid and 800 parts of fuming sulfuric acid containing about 3 per cent of sulfuric anhydride by heating at 50° C. for 24 hours, simultaneous sulfonation occurring. The sulfonic acid is dried and melted, analogously to Example 1, with 3 times its weight of N-methyl-para-anisidine at 45° C. for half an hour. In the form of the sodium salt, the new dyestuff dyes wool in an acid bath green tints whose fastness properties are improved by after-chroming.

(4) By replacing in the foregoing examples the 4'-chloro-3-hydroxy-benzophenone-4-carboxylic acid by the corresponding 4'-bromo-compound, the same dyestuffs are obtained.

We claim:

1. The compounds of the general formula:

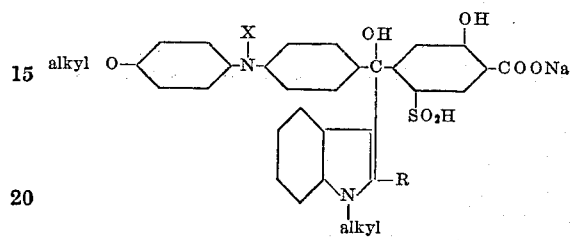

wherein X represents a member of the group consisting of hydrogen and alkyl and R represents a mononuclear aryl radical.

2. The compound of the formula:

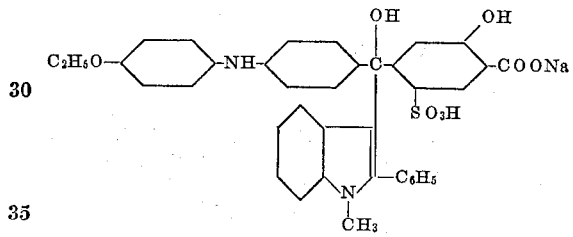

being a dyestuff which dyes wool green tints which when after-chromed acquire a fuller shade and have distinctly improved fastness properties.

3. The compound of the formula:

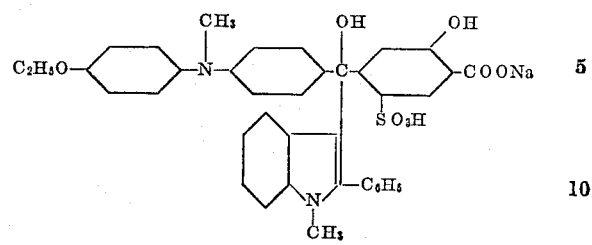

being a dyestuff which dyes wool yellowish green shades which may be after-chromed with improvement of their fastness properties.

4. The compound of the formula:

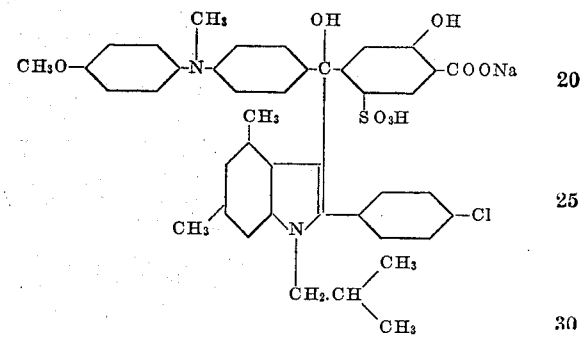

being a dyestuff which dyes wool in an acid bath yellowish green tints whose fastness properties are improved by after-chroming.

RICHARD WENZEL,
Administrator of the Estate of Paul Herbert Wolff, Deceased.

KARL FRANK.